US010568273B2

(12) United States Patent
Muranaka

(10) Patent No.: US 10,568,273 B2
(45) Date of Patent: Feb. 25, 2020

(54) HYDROCULTURE POT

(71) Applicant: Masahiro Muranaka, Osaka (JP)

(72) Inventor: Masahiro Muranaka, Osaka (JP)

(*) Notice: Subject to any disclaimer, the term of this patent is extended or adjusted under 35 U.S.C. 154(b) by 841 days.

(21) Appl. No.: 14/656,238

(22) Filed: Mar. 12, 2015

(65) Prior Publication Data

US 2015/0201564 A1    Jul. 23, 2015

Related U.S. Application Data

(60) Division of application No. 13/613,179, filed on Sep. 13, 2012, now abandoned, which is a continuation of application No. PCT/JP2011/057155, filed on Mar. 24, 2011.

(30) Foreign Application Priority Data

Mar. 24, 2010  (JP) .................................. 2010-067802

(51) Int. Cl.
*A01G 9/02*   (2018.01)
*A01G 27/02*   (2006.01)

(52) U.S. Cl.
CPC .............. *A01G 9/028* (2013.01); *A01G 9/02* (2013.01); *A01G 9/027* (2013.01); *A01G 27/02* (2013.01)

(58) Field of Classification Search
CPC ........ A01G 9/104; A01G 9/028; A01G 27/02; A01G 27/04; A01G 27/06; A01G 27/00; A01G 9/02; A01G 9/027
USPC ..... 47/65.5, 66.1, 66.2, 73, 80, 87, 32.7, 75, 47/85, 59 R, 62 R, 63, 41.01
See application file for complete search history.

(56) References Cited

U.S. PATENT DOCUMENTS

| 1,077,423 A | * | 11/1913 | Myers ................... A47G 7/047 47/67 |
| 1,439,143 A | | 6/1922 | Buss |
| 1,992,878 A | * | 2/1935 | Muller .................... A01G 9/02 47/80 |
| 2,140,932 A | | 2/1936 | Avery |
| 2,140,996 A | | 9/1936 | Heifetz |
| 2,484,909 A | | 8/1942 | Ritter |

(Continued)

FOREIGN PATENT DOCUMENTS

| FR | 2614417 A1 * | 10/1988 | ........... A01G 27/008 |
| JP | 55-5001 | 2/1980 | |

(Continued)

*Primary Examiner* — Son T Nguyen
(74) *Attorney, Agent, or Firm* — Robert P. Michal, Esq.; Carter, DeLuca & Farrell LLP

(57) ABSTRACT

Disclosed is a hydroculture pot that can store an optimum amount of water at which a water level is appropriate for a depth of roots. A soil culture pot, having a supply and drainage hole that enables supplying and draining of water in a bottom portion, is used and a partitioning wall, vertically partitioning an interior of the pot main body in a watertight manner to store an optimum amount of water at which a water level is appropriate for a depth of roots of a spider plant, is disposed at an inner circumferential surface of a pot main body. An interior of the pot main body is filled with hydroculture soil and the optimum amount of water is stored in the pot main body so that the water level appropriate for the depth of roots of spider plant planted in the pot main body is a maximum level.

6 Claims, 10 Drawing Sheets

(56) References Cited

U.S. PATENT DOCUMENTS

| | | | | |
|---|---|---|---|---|
| 2,459,561 A * | 1/1949 | Yawman | A47B 88/80 | 220/529 |
| 2,502,910 A * | 4/1950 | Wilcox | A01G 9/1423 | 47/18 |
| 2,671,239 A * | 3/1954 | Wisner | A47L 13/58 | 134/156 |
| 3,139,229 A * | 6/1964 | De Pasquale | B65D 5/48028 | 220/529 |
| 3,331,154 A * | 7/1967 | Schilling | A63H 33/00 | 47/61 |
| 3,369,321 A | 2/1968 | Blackistone, Jr. | | |
| 3,381,875 A * | 5/1968 | Tunick | B65D 3/24 | 220/524 |
| 3,391,816 A * | 7/1968 | Swett | A47J 47/02 | 220/534 |
| 3,576,088 A * | 4/1971 | Arca | A01G 27/04 | 239/57 |
| 3,906,667 A | 9/1975 | Williams | | |
| 4,014,135 A * | 3/1977 | Greenbaum | A01G 9/028 | 47/85 |
| 4,112,619 A * | 9/1978 | Morsani | A01G 9/02 | 47/66.1 |
| 4,120,119 A * | 10/1978 | Engel | A01G 9/028 | 220/4.26 |
| 4,142,325 A * | 3/1979 | Greenbaum | A01G 9/028 | 405/45 |
| 4,155,198 A * | 5/1979 | Kelley | A01G 9/104 | 206/446 |
| 4,213,274 A * | 7/1980 | Skaife | A01G 9/028 | 47/81 |
| 4,255,898 A * | 3/1981 | Greenbaum | A01G 9/028 | 220/533 |
| 4,328,641 A | 5/1982 | Tesch | | |
| 5,050,342 A * | 9/1991 | Figueroa | A01G 9/02 | 29/416 |
| 5,082,139 A * | 1/1992 | Quam | B65F 1/0046 | 220/530 |
| 5,918,415 A * | 7/1999 | Locke | A01G 27/00 | 119/74 |
| 5,979,112 A * | 11/1999 | Anderson | A01G 9/1026 | 47/66.5 |
| 6,042,858 A * | 3/2000 | Kairys | B65D 77/30 | 206/219 |
| 6,243,985 B1 * | 6/2001 | Miller | A01G 27/00 | 47/39 |
| 6,247,269 B1 * | 6/2001 | Valiquette | A01G 31/02 | 47/81 |
| 6,332,287 B1 * | 12/2001 | Geraldson | A01G 27/02 | 47/79 |
| 6,401,389 B1 * | 6/2002 | Mount | A01G 27/02 | 47/65.5 |
| 6,622,423 B1 * | 9/2003 | Riccardi | A01G 1/042 | 47/1.1 |
| 6,695,544 B2 * | 2/2004 | Knudson | E02D 29/025 | 220/601 |
| 8,051,603 B1 * | 11/2011 | Jung | A01G 9/026 | 47/66.1 |
| 8,800,802 B2 * | 8/2014 | Martin | B65D 85/78 | 220/529 |
| 2007/0022660 A1 * | 2/2007 | Buitendag | A01G 27/06 | 47/81 |
| 2011/0283615 A1 * | 11/2011 | Dickson | A01G 9/028 | 47/66.6 |
| 2012/0227321 A1 * | 9/2012 | Furumura | A01G 27/02 | 47/80 |

FOREIGN PATENT DOCUMENTS

| | | | |
|---|---|---|---|
| JP | 57-26728 | | 6/1982 |
| JP | 60-79942 | | 6/1985 |
| JP | 02076522 A | * | 3/1990 |
| JP | 02163009 A | * | 6/1990 |
| JP | 02312529 A | * | 12/1990 |
| JP | 06343349 A | * | 12/1994 |
| JP | 09023750 A | * | 1/1997 |
| JP | 09131137 A | * | 5/1997 |
| JP | 9168341 A | | 6/1997 |
| JP | 09279556 A | * | 10/1997 |
| JP | 10108556 A | * | 4/1998 |
| JP | 11032587 A | * | 2/1999 |
| JP | 11178449 A | * | 7/1999 |
| JP | 2000060308 A | * | 2/2000 |
| JP | 2000-04-04 A | | 4/2000 |
| JP | 2003088246 A | * | 3/2003 |

* cited by examiner

HYDROCULTURE POT

CROSS-REFERENCE TO RELATED APPLICATIONS

The present application is a Divisional of application Ser. No. 13/613,179 filed Sep. 13, 2012 which is a Continuation of International Application PCT/JP2011/057155 filed Mar. 24, 2011, which in turn claims priority from Japanese Patent Application No. 2010-067802 filed Mar. 24, 2010, the entire contents of each of which is incorporated herein by reference.

FIELD OF THE INVENTION

The present invention relates to a hydroculture pot used for cultivating a plant with culture soil and water.

BACKGROUND ART

Generally, an interior of a pot is filled with soil or other natural culture soil and a foliage plant planted in the natural culture soil is displayed indoors and thereby made to have a function as an interior decoration of excellent aesthetic appearance.

However, with a foliage plant using natural culture soil, odors, insects, and vermin arise due to the natural culture soil, and there is thus hesitancy against decorating such plants indoors, especially in a kitchen or a nursery and there are also problems in terms of sanitation in a restaurant, etc.

Thus, recently, arrangements have come to be known where an interior of a pot is filled with an artificial culture soil instead of a natural culture soil and a plant is planted in hydroculture, which enables cultivation by water stored in a bottom portion of the pot filled with the artificial culture soil, to not only obviously provide the function of an interior decoration of excellent aesthetic appearance but also enable sanitary indoor decoration without generation of odors, insects, and vermin (see, for example, Patent Document 1). As the artificial culture soil in this case, particulate matter, made up of an inorganic foam prepared by baking and foaming clay at a high temperature or a functional composite in which charcoal is covered with a porous ceramic, is used, and the inorganic foam is marketed under the trade name of Hydroball, etc., while the functional composite is marketed under the trade name of Neocoal, etc. Colored sand hydroculture kits, etc., of excellent interior design characteristics using hard, porous colored sand, prepared by coloring an ion exchange mineral, used as a root rot preventing agent, with a plant-based dye, in a transparent, glass pot are also being sold. In planting a plant in hydroculture, an existing pot that is appropriate for a size of the plant and is not provided with a supply and drainage hole in the bottom portion is used.

Also, the water stored in the bottom portion of the pot refers to an amount of water that becomes completely gone in approximately one week to two weeks due to water absorption by the plant, and storage of water of no less amount leads to root rot, inhibits plant growth, and causes generation of offensive odors as well as generation of insects and vermin.

PRIOR ART DOCUMENT(S)

Patent Document(s)

Patent Document 1: Japanese Published Unexamined Patent Application No. Hei 9-168341

SUMMARY OF THE INVENTION

Problem to be Solved by the Invention

In conventional culturing using a natural culture soil, a plant grows by its roots absorbing water contained in the culture soil, etc., and thus the plant grows even if a pot bottom is deep and the plant roots and the pot bottom are separated from each other. However, in hydroculture, a plant grows by the plant roots absorbing the water stored at the pot bottom and an amount of water that becomes completely gone in approximately one week to two weeks due to water absorption by the plant must thus be stored. For example, if a small seedling of a plant of 10 cm size is planted in a pot of 50 cm height, the plant roots and the water are separated from each other and thus the plant roots cannot absorb the water and the small plant cannot be cultivated in the pot with the deep bottom.

Further, in conventional culturing using a natural culture soil, plants of different sizes can be grown in a single pot because the plants grow by their roots absorbing the water contained in the culture soil, etc. However, in hydroculture, an amount of water that becomes completely gone in approximately one week to two weeks due to water absorption by the plants must be stored, and thus with the abovementioned pot, the water storage position changes with the size of the plant and plants that differ in size cannot be grown in a single pot.

Also, even if the plants planted are of the same variety and same size, the plant roots may differ in size according to production locality. Thus, even if the pots in which the plants are planted are the same, the water storage position may not be of the optimum amount.

Also, hydroculture in itself is a cultivation method that has come to be noted recently in Japan and thus the types of pots that can be used for hydroculture are not only few but also extremely expensive. Also, with existing pots that are not provided with a water supply and drainage hole in a bottom portion (for example, ceramic pots, glass pots, etc.), the depth of the pot bottom is predetermined, a pot appropriate for the size of the plant to be planted must thus be selected, and a pot appropriate for the size of the plant cannot be found readily. Also, a pot that one already owns and is of one's favorite design may not match the plant even if it is a pot that is not provided with a water supply and drainage hole in the bottom portion. Further, a pot provided with a water supply and drainage hole in the bottom portion cannot be used because water cannot be stored in the pot.

The present invention has been made in view of the above points and an object thereof is to provide a hydroculture pot capable of storing an optimum amount of water that becomes completely gone within approximately one week to two weeks due to water absorption by a plant planted in a pot main body.

Means for Solving the Problem

To achieve the above object, the present invention provides as a solution means, a hydroculture pot including a partitioning wall vertically partitioning an inner circumferential surface of a cylindrical pot main body and where the partitioning wall is disposed in a manner enabling movement in a vertical direction with respect to the inner circumferential surface of the pot main body.

According to this specified matter, the partitioning wall, which is arranged as a bottom plate, is moved vertically while applying contact pressure against the inner circumferential surface of the pot main body of cylindrical shape, and thus by vertically moving the partitioning wall in accordance with a plant to be planted, the plant can be planted and an optimum amount of water that becomes completely gone within approximately one week to two weeks by the plant absorbing water can be stored. For example, if a seedling of 10 centimeter size is to be planted in a hydroculture pot of 50 centimeter height, the partitioning wall can be moved in an upward direction in a state where the contact pressure is applied against the inner circumferential surface of the pot main body to enable the optimum amount of water to be stored. Further, when, in a pot in which a plant was planted once, a plant of a different size is to be replanted, storage of a water amount that is optimum for the plant to be planted is made possible by moving the partitioning wall up or down in accordance with the size of the planted plant in the state where the contact pressure is applied against the inner circumferential surface of the pot main body.

Also, to achieve the above object, the present invention provides as another solution means, a hydroculture pot including a cylindrical pot main body capable of housing a cylinder in its interior and a partitioning wall vertically partitioning an inner circumferential surface of the pot main body and where the partitioning wall is disposed in a manner enabling movement in a vertical direction with respect to the inner circumferential surface of the pot main body.

According to this specified matter, by vertically moving the partitioning wall in accordance with the size of the plant planted in the cylinder housed in the interior of the pot body, the plant inside the cylinder is housed at an optimum position in the interior of the pot main body and water of an optimum amount, at which a water level is appropriate for a depth of roots of the plant planted in the cylinder, can be stored in the interior of the pot main body.

Also preferably, the partitioning wall has elasticity and is disposed with it applying contact pressure against the inner circumferential surface of the pot main body.

In this case, by preparing a partitioning wall that is slightly larger than the inner circumferential surface of the pot main body and disposing the partitioning wall in a state of applying the contact pressure against the inner circumferential surface of the pot main body, the partitioning wall can be moved vertically easily in the state of applying the contact pressure against the inner circumferential surface of the pot main body and the optimum amount of water can be stored in the pot main body.

Preferably, the pot main body and the partitioning wall are coated by a waterproofing material.

In this case, occurrence of efflorescence and cracking due to permeation of water with time into the pot main body as the hydroculture pot can be prevented reliably.

Also, a soil culture pot may be applied as the pot main body.

In this case, an inexpensive soil pot can be used as a hydroculture pot and hydroculture can thereby be popularized widely.

Further preferably, the partitioning wall is formed of a material that is removable from the pot main body and is made reconstructable in the pot main body after being removed from the pot main body.

In this case, the partitioning wall is removed from the pot main body and a new partitioning wall is reconstructed in the pot main body when a new hydroculture plant is to be planted in place of a hydroculture plant that was planted in the pot main body or when transplanting is performed in accordance with growth of a hydroculture plant. An existing pot can thereby be reused as the hydroculture pot and the culture soil used in the existing pot can be reused as well.

Effect(s) of the Invention

In summary, by moving the partitioning wall vertically in the state of applying the contact pressure against the inner circumferential surface of the cylindrical pot main body, the partitioning wall can be moved vertically in accordance with the size of the planted plant to enable planting of the plant and storage of the optimum amount of water, which becomes completely gone in approximately one week to two weeks due to water absorption by the plant.

MODE(S) FOR CARRYING OUT THE INVENTION

To help understanding of the present invention, embodiments according to the present invention shall now be described with reference to the drawings. The embodiments described below are merely specific examples of the present invention and are not of a nature that restricts the technical scope of the present invention.

Figure 1:
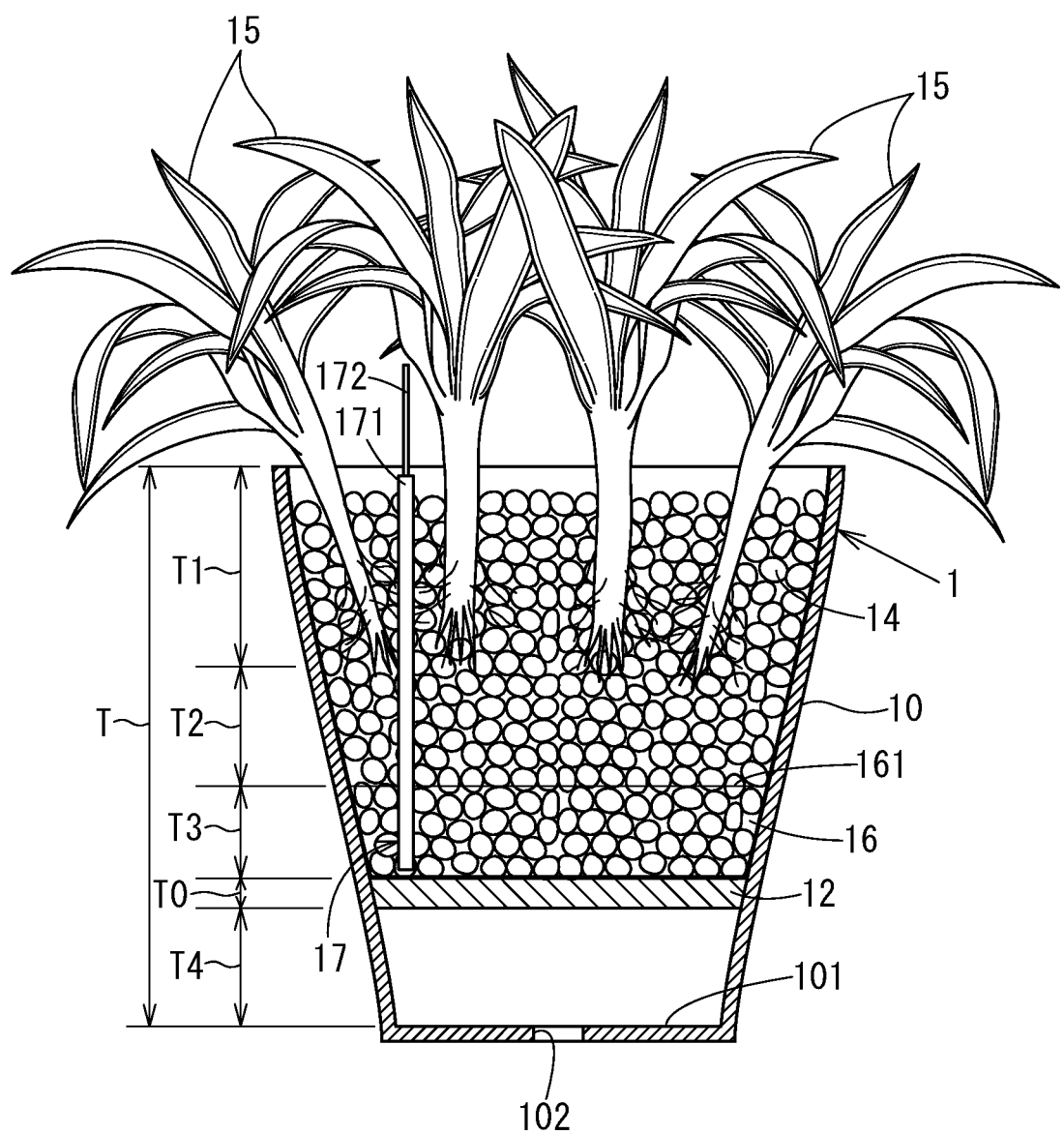
FIG. 1 is a longitudinal sectional front view of a hydroculture pot according to a first embodiment of the present invention.

A general arrangement of a hydroculture pot according to an embodiment of the present invention shall first be described using FIG. 1.

As shown in FIG. 1, 1 is the hydroculture pot, and an existing pot, that is, a soil culture pot having a supply and drainage hole 102, enabling supplying and draining of water, in a bottom portion 101 is applied as the hydroculture pot 1. A partitioning wall 12 that vertically partitions an interior of a pot main body 10 in a watertight manner is disposed at an inner circumferential surface of the pot main body 10 of the hydroculture pot 1.

Figure 2A:
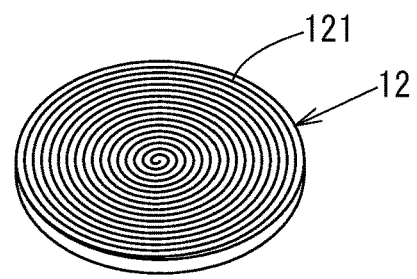
FIGS. 2A, 2B and 2C show explanatory diagrams of a procedure for preparing the hydroculture pot of FIG. 1 with FIG. 2A being a perspective view of a partitioning wall prepared from a rod-like object, FIG. 2B being a perspective view of a pot main body showing a state where the partitioning wall is mounted to an interior, and FIG. 2C being a perspective view of the pot main body showing a state where a waterproofing material is coated.
Figure 2B:
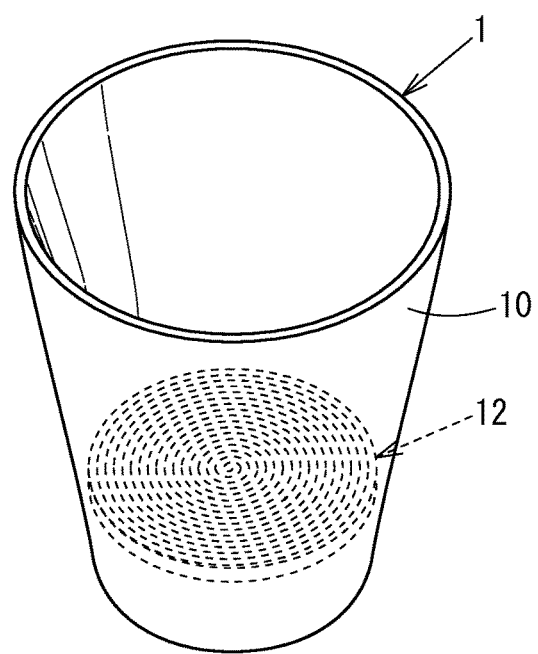

The partitioning wall 12 is prepared, for example, by concentrically winding a rod-like object 121, having a rectangular cross section and made of a closed cell polyethylene foam crosslinked by a chemical crosslinking agent, to a disk-like shape so as to fit along the inner circumferential surface of the pot main body 10 as shown in FIG. 2A or by cutting a sheet-like object (not shown) made of a closed cell polyethylene foam crosslinked by a chemical crosslinking agent to a disk-like shape. The partitioning wall 12 that is thus prepared to a disk-like shape has some elasticity and it is thus prepared to be slightly larger than an inner diameter of a partition portion of the pot main body 10 and is press-contacted by a frictional force in a state of applying a contact pressure against the inner circumferential surface of the pot main body 10 as shown in FIG. 2B. The rod-like object 121 or the sheet-like object from which the partitioning wall 12 is prepared is that used as a cushioning backup material, and as such a material, for example, Sunpelca made by Sanwa Kako Co., Ltd., or Softlon Board made by Sekisui Chemical Co., Ltd., etc., is used, and as an example restricted to a sheet-like object, a foam polystyrene board made by Sekisui Plastics Co., Ltd., etc., is used. In this case, the rod-like object 121 or the sheet-like object is set in thickness in consideration of a weight of a hydroculture plant planted in the pot main body 10, a weight of a hydroculture soil 14 (to be described below), an amount of stored water 16 (to be described below), etc., and an object with a thickness of approximately 20 mm to 40 mm is normally used.

Figure 2C:
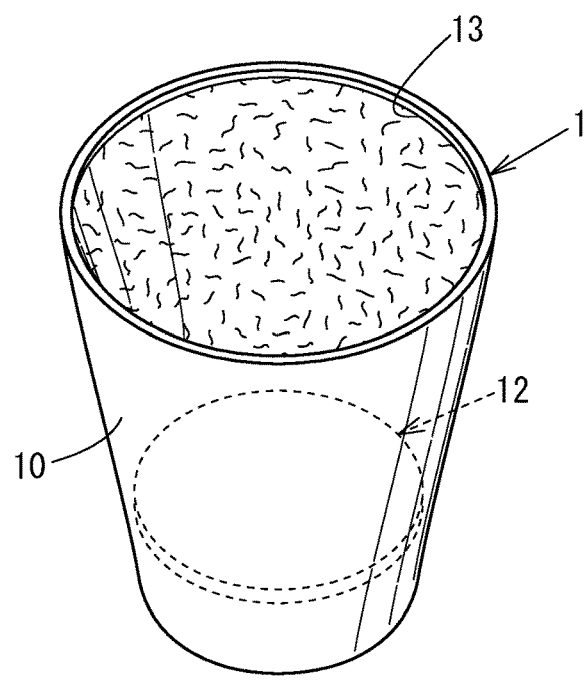

Also, as shown in FIG. 2C, an upper surface of the partitioning wall 12 and a portion of the inner peripheral surface of the pot main body 10 positioned at an upper side relative to the partitioning wall 12 are coated substantially uniformly with a caulking material 13 or a coating waterproofing material as a waterproofing material. As the caulking material 13, a silicon-based material is used, and coating is performed using a spatula, etc., so that uneven coating does not occur. Also, as the coating waterproofing material, a water-based material is used, and coating is performed using a brush, etc., so that uneven coating does not occur. In this case, a sealant made by Shin-Etsu Chemical Co., Ltd., etc., is used, for example, as the caulking material 13, and Paratex, which is water-based and made by Ozeki Chemical Industry Co., Ltd., etc., is used, for example, as the coating waterproofing material.

An interior of the hydroculture pot 1 that is partitioned and raised from the bottom portion 101 by the partitioning wall 12 is filled with the granular hydroculture soil 14 (artificial culture soil) made up of an inorganic foam made by baking and foaming clay at a high temperature or a functional composite in which charcoal is covered with a porous ceramic, etc. A spider plant 15 is planted as the hydroculture plant in the hydroculture soil 14. The spider plant 15 was planted in a natural culture soil and is replanted in the hydroculture soil 14 as the hydroculture plant upon removing the natural culture soil with water from its roots. Also, an optimum amount of the water 16 at which a water level is appropriate for a depth of roots of the spider plant 15 is stored in the interior of the hydroculture pot 1. The spider plant 15 is of a variety that favors the depth of its roots being positioned approximately 30 to 60 mm above the water level 161 of the water 16 of the optimum amount when planted in the pot main body 10.

Here, the optimum amount of the water 16 stored in the interior of the pot main body 10 is the amount (required amount) deemed necessary for approximately one week to two weeks of growth of the spider plant 15 planted in the hydroculture pot 1 and storage of water of no less amount causes putrefaction of water and root rot. Hence to meet the requirements of the roots of the spider plant 15, the water 16 of the optimum amount must be stored approximately 30 to 60 mm below the depth of the roots. In this case, the optimum amount of the water 16 is such that the water level 161 is approximately one-third to one-fifth a height of the interior of the hydroculture pot 1 partitioned by the partitioning wall 12.

Specifically as shown in FIG. 1, when in a case where the depth T1 of the roots of the spider plant 15, planted in the hydroculture soil 14 of the hydroculture pot 1 with a height T of the interior of the pot main body 10 being 250 mm, is 70 mm, the partitioning wall 12 of a thickness T0 (20 mm), which is selected in consideration of the weight of the spider plant 15, the weight of the hydroculture soil 14, and the weight of the optimum amount of water 16 stored, etc., is to be constructed with an interval T2 (of, for example, 50 mm) being set between the water level 161 of the water 16 of the optimum amount and the root depth T1 of the spider plant 15 that favors the root depth T1 being positioned approximately 30 to 60 mm above the water level 161 of the water 16 of the optimum amount in storing the water 16 of the optimum amount of a height T3 (of, for example, 50 mm) at which the water level 161 is approximately one-third to one-fifth the height of the interior of the hydroculture pot 1, the partitioning wall 12 is constructed so that its lower surface is positioned just T4 (60 mm) above the bottom portion 101 of the pot main body 10.

Further, a water gauge 17 is disposed in the interior of the hydroculture pot 1. The water gauge 17 includes a cylindrical body 171, extending in a substantially vertical direction from immediately above the partitioning wall 12 to an upper edge of the pot main body 10, and a float 172, which is inserted in an interior of the cylindrical body 171 in a manner enabling advancing and retreating and changes in amount of advancing or retreating from an upper end of the cylindrical body 171 in accordance with the water level 161 of the water 16. In this case, replenishment of the water 16 into the interior of the pot main body 10, although dependent on the variety or size of the hydroculture plant, is performed upon elapse of five days to ten days after the float 172 has finished retreating with respect to the cylindrical body 171.

Figure 3A:
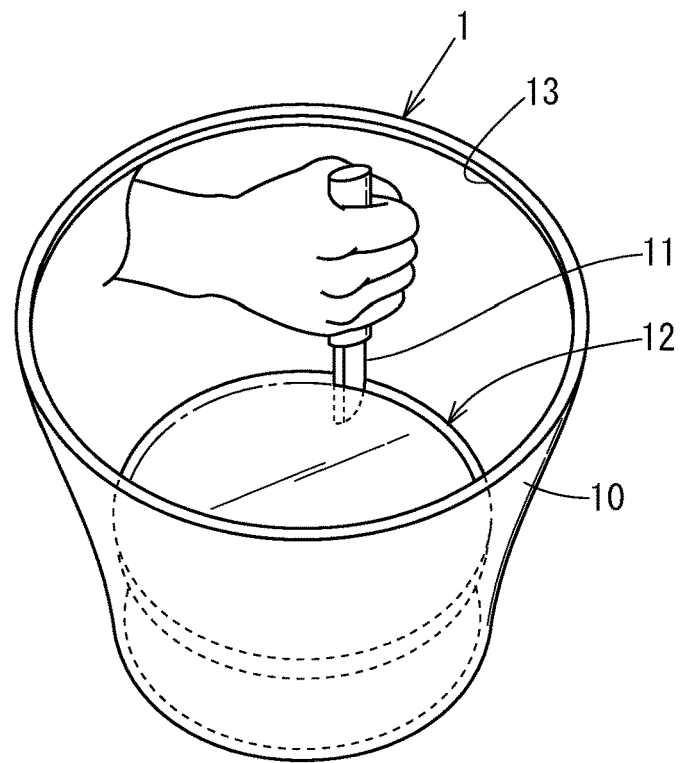
FIGS. 3A and 3B show explanatory diagrams of a procedure for removing the partitioning wall of the hydroculture pot of FIG. 1 with FIG. 3A being a perspective view of the pot main body showing a state where an incision is made in the partitioning wall and FIG. 3B being a perspective view showing a state where the partitioning wall has been removed upon being cut.
Figure 3B:
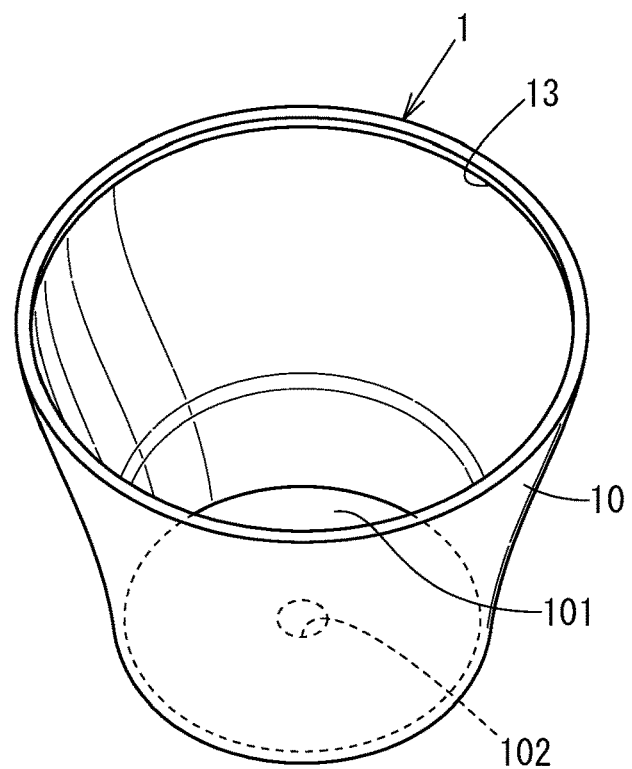

Also as shown in FIG. 3, the closed cell polyethylene foam (rod-like object 121) forming the partitioning wall 12 is a material that can be cut with a box cutter 11, etc., and is removable from the pot main body 10. In the interior of the pot main body 10 from which the partitioning wall 12 has been removed, a new partitioning wall can be reconstructed so that an optimum amount of water at which the water level is appropriate for the depth of the roots of a hydroculture plant that is planted subsequently will be stored.

Thus, in the present embodiment, an existing pot, such as the soil culture pot, having the supply and drainage hole 102, enabling supplying and draining of water, in the bottom portion 101 is used and the interior of the pot main body 10 is vertically partitioned in a watertight manner by the partitioning wall 12 disposed at the inner peripheral surface of the pot main body 10. Thus, even an existing pot can be made to store the optimum amount of water 16 at which the water level 161 is appropriate for the depth of the roots of the spider plant 15 as the hydroculture plant and be used as the hydroculture pot 1. The spider plant 15 and the hydroculture pot 1 (existing pot) are thereby matched to each other, and by storing the optimum amount of water 16 so that the water level 161 is approximately one-third to one-fifth the height of the interior of the hydroculture pot 1 partitioned by the partitioning wall 12 (height from the upper edge of the pot main body 10 to the partitioning wall 12), the water level 161 is made appropriate for the depth T1 of the roots of the spider plant 15, that is, the depth T1 of the roots upon planting in the pot main body 10 is positioned approximately 50 mm above the water level 161 of the water 16 of the optimum amount to meet the requirement of the variety of spider plant 15 and the spider plant 15 can thus be grown smoothly.

Moreover, an existing pot can be used as the hydroculture pot 1, thereby enabling the types of hydroculture pot 1 to be increased easily and the hydroculture pot 1 to be presented extremely inexpensively.

Also, the upper surface of the partitioning wall 12 and the portion of the inner circumferential surface of the pot main body 10 positioned at the upper side relative to the partitioning wall 12 is coated substantially uniformly by the caulking material 13, and occurrence of efflorescence and cracking due to permeation of water with time into the existing pot used as the hydroculture pot 1 can thus be prevented reliably.

Further, the partitioning wall 12 is formed of a material, such as the closed cell polyethylene foam, that can be removed from the pot body 10 and is made reconstructable after being cut by a box cutter 11 and removed from the pot main body 10 so that the optimum amount of water 16 at which the water level 161 is appropriate for the depth of the roots of a new hydroculture plant that is planted next in the pot main body 10 is stored, and thus when a new hydroculture plant is to be planted in place of the spider plant 15 planted in the pot main body 10 or when the spider plant 15 is to be replanted in accordance with its growth, the partitioning wall 12 is removed from the pot main body 10 and a new partitioning wall 12 is reconstructed. The existing pot can thereby be reused as the hydroculture pot 1 and the hydroculture soil 14 used in the existing pot can be reused again.

A second embodiment of the present invention shall now be described based on FIG. 4.

With the present embodiment, a hydroculture pot used for planting a *Pachira aquatica* as a hydroculture plant shall be described. Arrangements besides the *Pachira aquatica* and the hydroculture pot are the same as those of the first embodiment and portions that are the same shall be provided with the same symbols and detailed description thereof shall be omitted.

Figure 4:
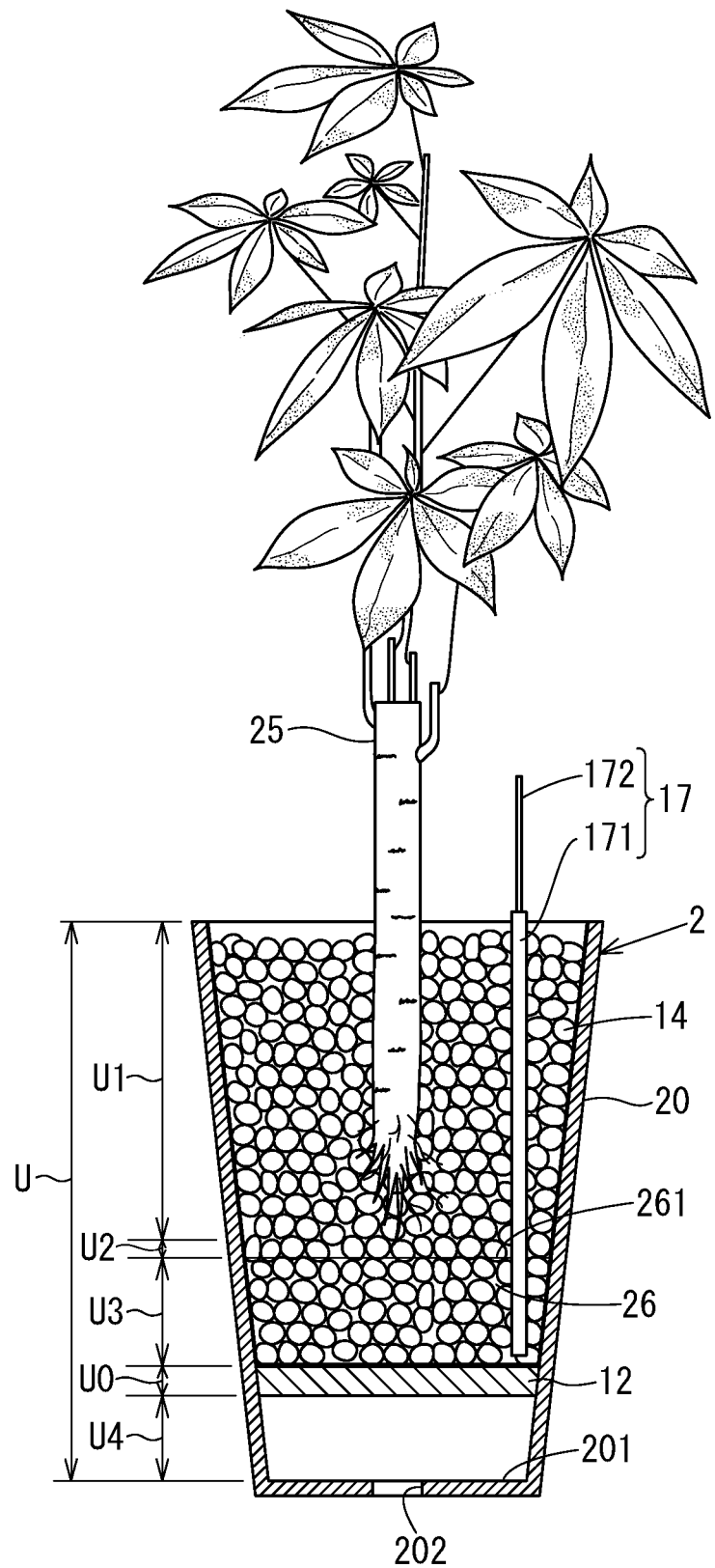
FIG. 4 is a longitudinal sectional front view of a hydroculture pot according to a second embodiment of the present invention.

That is, with the present embodiment, 2 is the hydroculture pot, and as the hydroculture pot 2, an existing pot, that is, a soil culture pot having a supply and drainage hole 202, enabling supplying and draining of water, in a bottom portion 201 is applied as shown in FIG. 4. The partitioning wall 12 that vertically partitions an interior of a pot main body 20 in a watertight manner is disposed at an inner circumferential surface of a pot main body 20 of the hydroculture pot 2.

An interior of the hydroculture pot 2 that is partitioned by the partitioning wall 12 is filled with the hydroculture soil 14 and the *Pachira aquatica* 25 is planted as the hydroculture plant in the hydroculture soil 14. The *Pachira aquatica* 25 was planted in a natural culture soil and is replanted in the hydroculture soil 14 as the hydroculture plant upon removing the natural culture soil with water from its roots. Also, an optimum amount of water 26 at which a water level 261 is appropriate for a depth of the roots of the *Pachira aquatica* 25 is stored in the interior of hydroculture pot 2. The *Pachira aquatica* 25 is of a variety that favors the depth of its roots being positioned approximately 10 to 30 mm above the water level 261 of the water 26 of the optimum amount when planted in the pot main body 20.

Here, the optimum amount of the water 26 stored in the interior of the pot main body 20 is the amount (required amount) deemed necessary for approximately one week to two weeks of growth of the *Pachira aquatica* 25 planted in the hydroculture pot 2 and storage of water of no less amount causes putrefaction of water and root rot. Hence to meet the requirements of the roots of the *Pachira aquatica* 25, the water 26 of the optimum amount must be stored approximately 10 to 30 mm below the depth of the roots. In this case, the optimum amount of water 26 is such that the water level 261 is approximately one-third to one-fifth the height of the interior of the hydroculture pot 2 partitioned by the partitioning wall 12.

Specifically, when in a case where the depth U1 of the roots of the *Pachira aquatica* 25, planted in the hydroculture soil 14 of the hydroculture pot 2 with a height U of the interior of the pot main body 20 being 360 mm, is 190 mm, the partitioning wall 12 of a thickness U0 (30 mm), which is selected in consideration of the weight of the *Pachira aquatica* 25, the weight of the hydroculture soil 14, and the weight of the optimum amount of water 26 stored, etc., is to be constructed with an interval U2 (of, for example, 10 mm) being set between the water level 261 of the water 26 of the optimum amount and the root depth U1 of the *Pachira aquatica* 25 that favors the root depth U1 being positioned approximately 10 to 30 mm above the water level 261 of the water 26 of the optimum amount in storing the water 26 of the optimum amount of a height U3 (of, for example, 70 mm) at which the water level 261 is approximately one-third to one-fifth the height of the interior of the hydroculture pot 2, the partitioning wall 12 is constructed so that its lower surface is positioned just U4 (60 mm) above the bottom portion 201 of the pot main body 20.

Also, the water gauge 17 is disposed in the interior of the hydroculture pot 2 as well. The float 172 of the water gauge 17 is inserted in a manner enabling advancing and retreating in the interior of the cylindrical body 171, extending in a substantially vertical direction from immediately above the partitioning wall 12 to an upper edge of the pot main body 20, and changes in the amount of advancing or retreating from the upper end of the cylindrical body 171 in accordance with the water level 261 of the water 26.

Thus, in the present embodiment, an existing pot, such as the soil culture pot, having the supply and drainage hole 202, enabling supplying and draining of water, in the bottom portion 201 is used and the interior of the pot main body 20 is vertically partitioned in a watertight manner by the partitioning wall 12 disposed at the inner peripheral surface of the pot main body 20. Thus, even an existing pot can be made to store the optimum amount of water 26 at which the water level 261 is appropriate for the depth U1 of the roots of the *Pachira aquatica* 25 as the hydroculture plant and be used as the hydroculture pot 2. The *Pachira aquatica* 25 and the hydroculture pot 2 (existing pot) are thereby matched to each other, and by storing the optimum amount of water 26 so that the water level 261 is approximately one-third to one-fifth the height of the interior of the hydroculture pot 2 (height from the upper edge of the pot main body 20 to the partitioning wall 12), the water level 261 is made appropriate for the depth U1 of the roots of the *Pachira aquatica* 25, that is, the depth U1 of the roots upon planting in the pot main body 20 is positioned approximately 10 mm above the water level 261 of the water 26 of the optimum amount to meet the requirement of the variety of *Pachira aquatica* 25 and the *Pachira aquatica* 25 can thus be grown smoothly.

A third embodiment of the present invention shall now be described based on FIG. 5.

With the present embodiment, a hydroculture pot used for planting an *Areca* palm as a hydroculture plant shall be described. Arrangements besides the *Areca* palm and the hydroculture pot are the same as those of the first embodiment and portions that are the same shall be provided with the same symbols and detailed description thereof shall be omitted.

Figure 5:
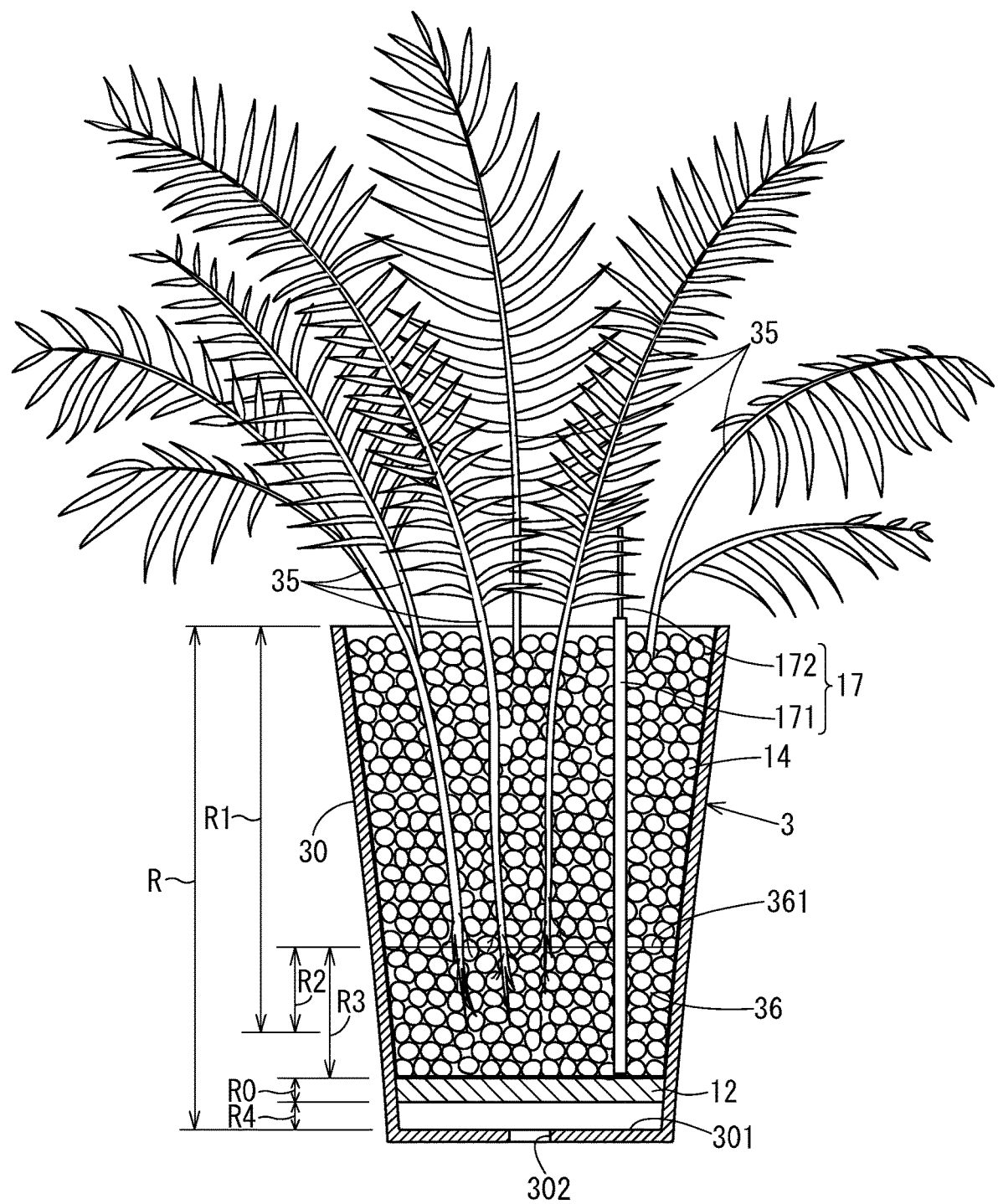
FIG. 5 is a longitudinal sectional front view of a hydroculture pot according to a third embodiment of the present invention.

That is, with the present embodiment, 3 is the hydroculture pot, and as the hydroculture pot 3, an existing pot, that is, a soil culture pot having a supply and drainage hole 302, enabling supplying and draining of water, in a bottom portion 301 is applied as shown in FIG. 5. The partitioning wall 12 that vertically partitions an interior of a pot main body 30 in a watertight manner is disposed at an inner circumferential surface of a pot main body 30 of the hydroculture pot 3.

An interior of the hydroculture pot 3 that is partitioned by the partitioning wall 12 is filled with the hydroculture soil 14 and the *Areca* palm 35 is planted as the hydroculture plant in the hydroculture soil 14. The *Areca* palm 35 was planted in a natural culture soil and is replanted in the hydroculture soil 14 as the hydroculture plant upon removing the natural culture soil with water from its roots. Also, an optimum amount of water 36 at which a water level 361 is appropriate for a depth of the roots of the *Areca* palm 35 is stored in the interior of hydroculture pot 3. The *Areca* palm 35 is of a variety that favors the depth of its roots being positioned approximately 10 to 30 mm below the water level 361 of the water 36 of the optimum amount when planted in the pot main body 30.

Here, the optimum amount of the water 36 stored in the interior of the pot main body 30 is the amount (required amount) deemed necessary for approximately one week to two weeks of growth of the *Areca* palm 35 planted in the hydroculture pot 3 and storage of water of no less amount causes putrefaction of water and root rot. Hence to meet the requirements of the roots of the *Areca* palm 35, the water 36 of the optimum amount must be stored approximately 10 to 30 mm above the depth of the roots. In this case, the optimum amount of water 36 is such that the water level 361 is approximately one-third to one-fifth a height of the interior of the hydroculture pot 3 partitioned by the partitioning wall 12.

Specifically, when in a case where the depth R1 of the roots of the *Areca* palm 35, planted in the hydroculture soil 14 of the hydroculture pot 3 with a height R of the interior of the pot main body 30 being 470 mm, is 290 mm, the partitioning wall 12 of a thickness R0 (40 mm), which is selected in consideration of the weight of the *Areca* palm 35, the weight of the hydroculture soil 14, and the weight of the optimum amount of water 36 stored, etc., is to be constructed with an overlap amount corresponding to an interval R2 (of, for example, 30 mm) being set between the water level 361 of the water 36 of the optimum amount and the root depth R1 of the *Areca* palm 35 that favors the root depth R1 being positioned approximately 10 to 30 mm below the water level 361 of the water 36 of the optimum amount in storing the water 36 of the optimum amount of a height R3 (of, for example, 130 mm) at which the water level 361 is approximately one-third to one-fifth the height of the interior of the hydroculture pot 3, the partitioning wall 12 is constructed so that its lower surface is positioned just R4 (40 mm) above the bottom portion 301 of the pot main body 30.

Also, the water gauge 17 is disposed in the interior of the hydroculture pot 3 as well. The float 172 of the water gauge 17 is inserted in a manner enabling advancing and retreating in the interior of the cylindrical body 171, extending in a substantially vertical direction from immediately above the partitioning wall 12 to an upper edge of the pot main body 30, and changes in the amount of advancing or retreating from the upper end of the cylindrical body 171 in accordance with the water level 361 of the water 36.

Thus, in the present embodiment, an existing pot, such as the soil culture pot, having the supply and drainage hole 302, enabling supplying and draining of water, in the bottom portion 301 is used and the interior of the pot main body 30 is vertically partitioned in a watertight manner by the partitioning wall 12 disposed at the inner peripheral surface of the pot main body 30. Thus, even an existing pot can be made to store the optimum amount of water 36 at which the water level 361 is appropriate for the depth R1 of the roots of the *Areca* palm 35 as the hydroculture plant and be used as the hydroculture pot 3. The *Areca* palm 35 and the hydroculture pot 3 (existing pot) are thereby matched to each other, and by storing the optimum amount of water 36 so that the water level 361 is approximately one-third to one-fifth the height of the interior of the hydroculture pot 3 (height from the upper edge of the pot main body 30 to the partitioning wall 12), the water level 361 is made appropriate for the depth R1 of the roots of the *Areca* palm 35, that is, the depth R1 of the roots upon planting in the pot main body 30 is positioned approximately 30 mm below the water level 361 of the water 36 of the optimum amount to meet the requirement of the variety of *Areca* palm 35 and the *Areca* palm 35 can thus be grown smoothly.

A fourth embodiment of the present invention shall now be described based on FIG. 6 and FIG. 7.

With the present embodiment, a hydroculture pot used for group planting a spider plant and a *Pachira aquatica* as hydroculture plants shall be described. Arrangements besides the hydroculture pot are the same as those of the first and second embodiments and portions that are the same shall be provided with the same symbols and detailed description thereof shall be omitted.

Figure 6:
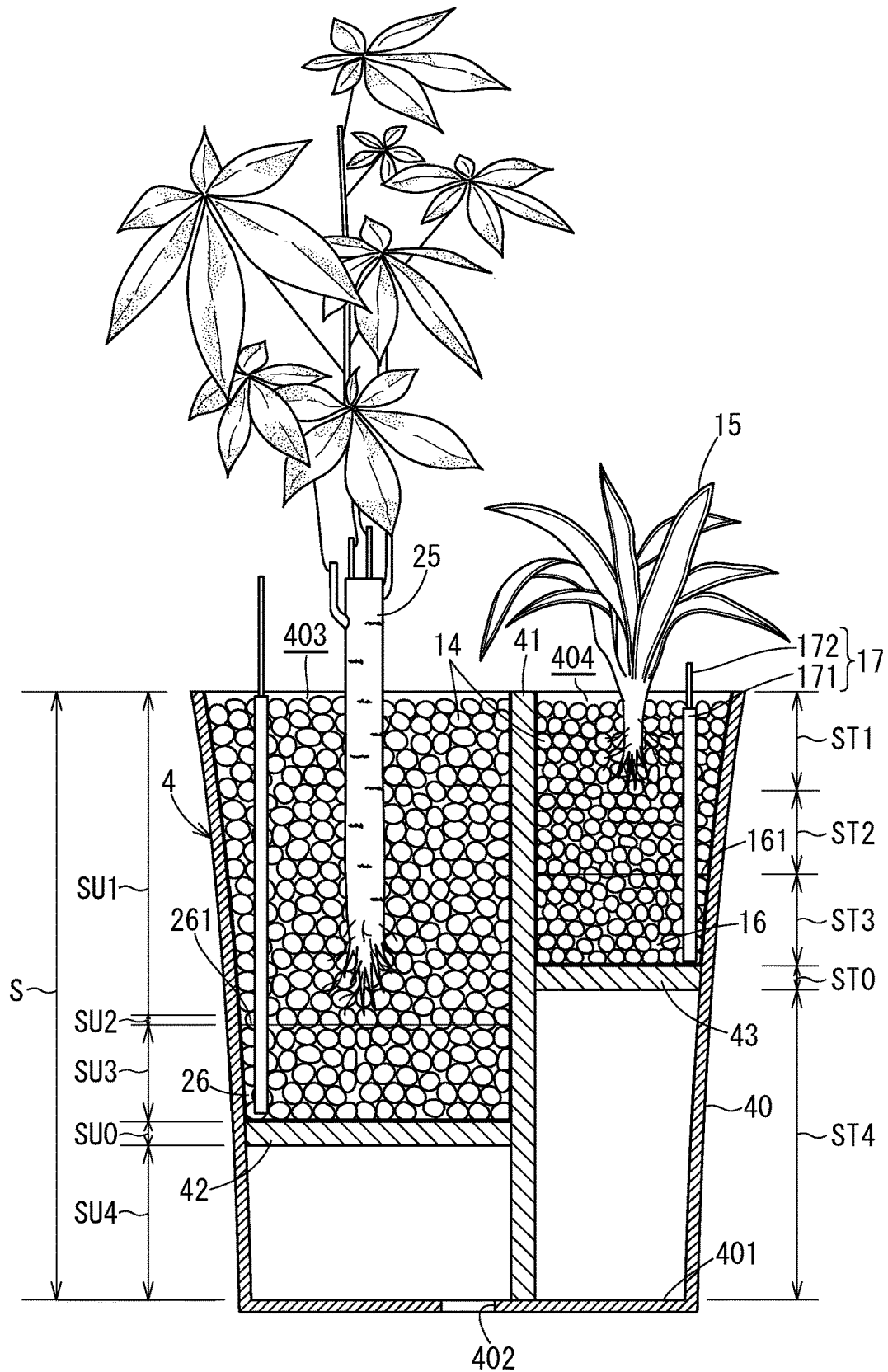
FIG. 6 is a longitudinal sectional front view of a hydroculture pot according to a fourth embodiment of the present invention.
Figure 7:
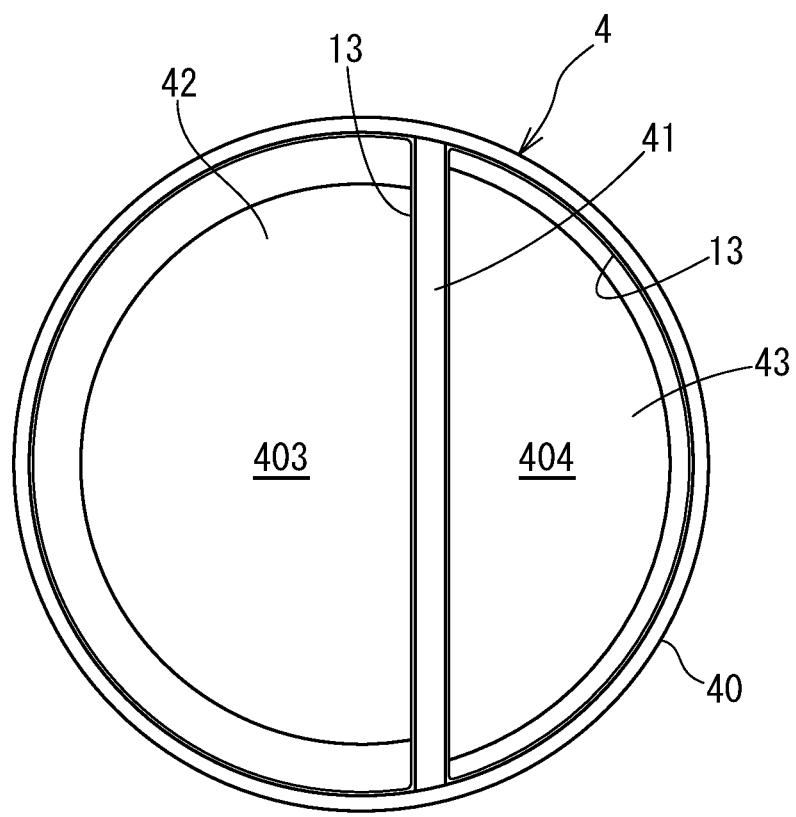
FIG. 7 is a plan view of the hydroculture pot of FIG. 6.

That is, with the present embodiment, 4 is the hydroculture pot, and as the hydroculture pot 4, an existing pot, that is, a soil culture pot having a supply and drainage hole 402, enabling supplying and draining of water, in a bottom portion 401 is applied as shown in FIG. 6. At an inner circumferential surface of a pot main body 40 of the hydroculture pot 4 are disposed a first partitioning wall 41 that partitions an interior of a pot main body 40 in a watertight manner in a longitudinal direction to right and left sides and second partitioning walls 42 and 43 by which two internal spaces 403 and 404, partitioned to the right and left by the first partitioning wall 41, are respectively partitioned individually and vertically in a watertight manner.

The first and second partitioning walls 41 to 43 are prepared by cutting sheet-like objects made of a closed cell polyethylene foam crosslinked by a chemical crosslinking agent to desired shapes, that is, whereas the first partitioning wall 41 is prepared to a substantially rectangular shape so as to partition the interior of the pot main body 40 at a right/left partition portion, the second partitioning walls 42 and 43 are respectively prepared to substantially arcuate shapes in accordance with shapes of partition portions of the right and left internal spaces 403 and 404 partitioned by the first partitioning wall 41. The first partitioning wall 41 that is thus prepared to the substantially rectangular shape and the second partitioning walls 42 and 43 have some elasticity and these are thus prepared to be slightly larger than inner diameters of the partition portions of the pot main body 40 and are press-contacted by frictional forces in states of applying contact pressures against the inner circumferential surface of the pot main body 40. The sheet-like object from which the first and second partitioning walls 41 to 43 are prepared is that used as a cushioning backup material for high-rise building window frames, and as such a material, for example, Sunpelca made by Sanwa Kako Co., Ltd., Softlon Board made by Sekisui Chemical Co., Ltd., or a foam polystyrene board made by Sekisui Chemical Co., Ltd., etc., is used. In this case, the sheet-like object is set in thickness in consideration of the weight of each hydroculture plant planted in the pot main body 40, the weight of the hydroculture soil 14, an amount of water 46 (to be described below) stored, etc., and an object with a thickness of approximately 20 mm to 40 m is normally used.

Also, front and rear surfaces of the first partitioning wall 41, upper surfaces of the second partitioning walls 42 and 43, and portions of the inner peripheral surface of the pot main body 40 positioned at upper sides relative to the respective second partitioning walls 42 and 43 are coated substantially uniformly with the caulking material 13 or a coating waterproofing material as a waterproofing material.

The internal spaces 403 and 404 of the hydroculture pot 4 that are partitioned by the respective partitioning walls 41 to 43 are filled with the hydroculture soil 14. While the *Pachira aquatica* 25 is planted in the hydroculture soil 14 in one internal space 403 (the internal space at the left side in FIG. 6) among the internal spaces, the spider plant 15 is planted in the hydroculture soil 14, in the other internal space 404 (the internal space at the right side in FIG. 6). Also, the optimum amount of water 26 at which the water level 261 is appropriate for the depth of the roots of the *Pachira aquatica* 25 is stored in the one internal space 403 of the hydroculture pot 4. The *Pachira aquatica* 25 is of a variety that favors the depth of its roots being positioned approximately 10 to 30 mm above the water level 261 of the water 26 of the optimum amount when planted in the one internal space 403. Also, the optimum amount of water 16 at which the water level 161 is appropriate for the depth of the roots of the spider plant 15 is stored in the other internal space 404 of the hydroculture pot 4. The spider plant 15 is of a variety that favors the depth of its roots being positioned approximately 30 to 60 mm above the water level 161 of the water 16 of the optimum amount when planted in the other internal space 404.

Hence to meet the requirements of the roots of the *Pachira aquatica* 25 in the one internal space 403 of the hydroculture pot 4 partitioned by the second partitioning wall 42, the water 26 of the optimum amount must be stored approximately 10 to 30 mm below the depth of the roots, and the optimum amount of the water is such that the water level 261 is approximately one-third to one-fifth the height from an upper edge of the pot main body 40 to the second partitioning wall 42. Also, to meet the requirements of the roots of the spider plant 15 in the other internal space 404 of the hydroculture pot 4 partitioned by the second partitioning wall 43, the water 16 of the optimum amount must be stored approximately 30 to 60 mm below the depth of the roots, and the optimum amount of water 16 is such that the water level 161 is approximately one-third to one-fifth a height from the upper edge of the pot main body 40 to the second partitioning wall 42.

Specifically, when in a case where the depth SU1 of the roots of the *Pachira aquatica* 25, planted in the one internal space 403 of the hydroculture pot 4 with a height S of the interior of the pot main body 10 being 450 mm, is 190 mm, the second partitioning wall 42 of a thickness SU0 (30 mm), which is selected in consideration of the weight of the *Pachira aquatica* 25, the weight of the hydroculture soil 14, and the weight of the optimum amount of water 26 stored, is to be constructed with an interval SU2 (of, for example, 10 mm) being set between the water level 261 of the water 26 of the optimum amount and the root depth SU1 of the *Pachira aquatica* 25 that favors the root depth SU1 being positioned approximately 10 to 30 mm above the water level 261 of the water 26 of the optimum amount in storing the water 26 of the optimum amount of a height SU3 (of, for example, 60 mm) at which the water level 261 is approximately one-third to one-fifth the height at the one internal space 403, the second partitioning wall 42 is constructed so that its lower surface is positioned just SU4 (160 mm) above the bottom portion 401 of the pot main body 40.

Meanwhile, when in a case where the depth ST1 of the roots of the spider plant 15 planted in the other internal space 404 of the hydroculture pot 4 is 70 mm, the second partitioning wall 43 of a thickness ST0 (20 mm), which is selected in consideration of the weight of the spider plant 15, the weight of the hydroculture soil 14, and the weight of the optimum amount of water 16 stored, is to be constructed with an interval ST2 (of, for example, 50 mm) being set between the water level 161 of the water 16 of the optimum amount and the root depth ST1 of the spider plant 15 that favors the root depth ST1 being positioned approximately 30 to 60 mm above the water level 161 of the water 16 of the optimum amount in storing the water 16 of the optimum amount of a height ST3 (of, for example, 50 mm) at which the water level 161 is approximately one-third to one-fifth the height at the other internal space 404, the second partitioning wall 43 is constructed so that its lower surface is positioned just ST4 (260 mm) above the bottom portion 401 of the pot main body 40.

Also, the water gauges 17 are disposed in the two internal spaces 403 and 404 of the hydroculture pot 4 as well. The float 172 of each water gauge 17 is inserted in a manner enabling advancing and retreating in the interior of the cylindrical body 171, extending in a substantially vertical direction from immediately above the second partitioning wall 42 or 43 to an upper edge of the pot main body 40, and changes in the amount of advancing or retreating from the upper end of the cylindrical body 171 in accordance with the water level 161 or 261 of the water 16 or 26.

Thus, in the present embodiment, an existing pot, such as the soil culture pot, etc., having the supply and drainage hole 402, enabling supplying and draining of water, in the bottom portion 401 is used, the interior of the pot main body 40 is partitioned in the longitudinal direction to the two right and left internal spaces 403 and 404 in a watertight manner by the first partitioning wall 41 disposed at the inner peripheral surface of the pot main body 40, and the two internal spaces 403 and 404 are respectively partitioned individually and vertically in a watertight manner by the second partitioning walls 42 and 43. Thus, even an existing pot can be made to store, in the one internal space 403, the optimum amount of water 26 at which the water level 261 is appropriate for the depth SU1 of the roots of the *Pachira aquatica* 25 as the hydroculture plant and store, in the other internal space 404, the optimum amount of water 16 at which the water level 161 is appropriate for the depth ST1 of the roots of the spider plant 15 as the hydroculture plant and used as the hydroculture pot 4. The spider plant 15 and the *Pachira aquatica* 25, which differ mutually in the favorable depth of the roots with respect to the water level 161 or 261 of the water 16 or 26 of the optimum amount, and the two internal spaces 403 and 404 of the hydroculture pot 4 (existing pot) are thereby matched to each other, and by storing the optimum amounts of the water 16 and 26 so that the water levels 161 and 261 are respectively approximately one-third to one-fifth the height of the internal spaces 403 and 404, the water levels 261 and 161 are made appropriate for the depths SU1 and ST1 of the roots of the *Pachira aquatica* 25 and the spider plant 15. That is, while the depth SU1 of the roots upon planting in the one internal space 403 is positioned approximately 10 mm above the water level 261 of the water 26 of the optimum amount to meet the requirement of the variety of *Pachira aquatica* 25, the depth ST1 of the roots upon planting in the other internal space 404 is positioned approximately 40 mm above the water level 161 of the water 16 of the optimum amount to meet the requirement of the variety of spider plant 15, and the *Pachira aquatica* 25 and the spider plant 15 can thus be grown smoothly.

Moreover, an existing pot can be used as the hydroculture pot 4, and thus the types of hydroculture pot 4 can be increased easily to accommodate needs of group planting the *Pachira aquatica* 25 of high height and the spider plant 15 of low height, etc., and the hydroculture pot 4 can be presented extremely inexpensively.

A fifth embodiment of the present invention shall now be described based on FIG. 8 and FIG. 9.

With the present embodiment, a case where a small plant 53 is to be planted as a hydroculture plant in a straight-shaped hydroculture pot with a height of approximately 50 cm height shall be described. Portions that are the same shall be provided with the same symbols and detailed description thereof shall be omitted.

Figure 8A:
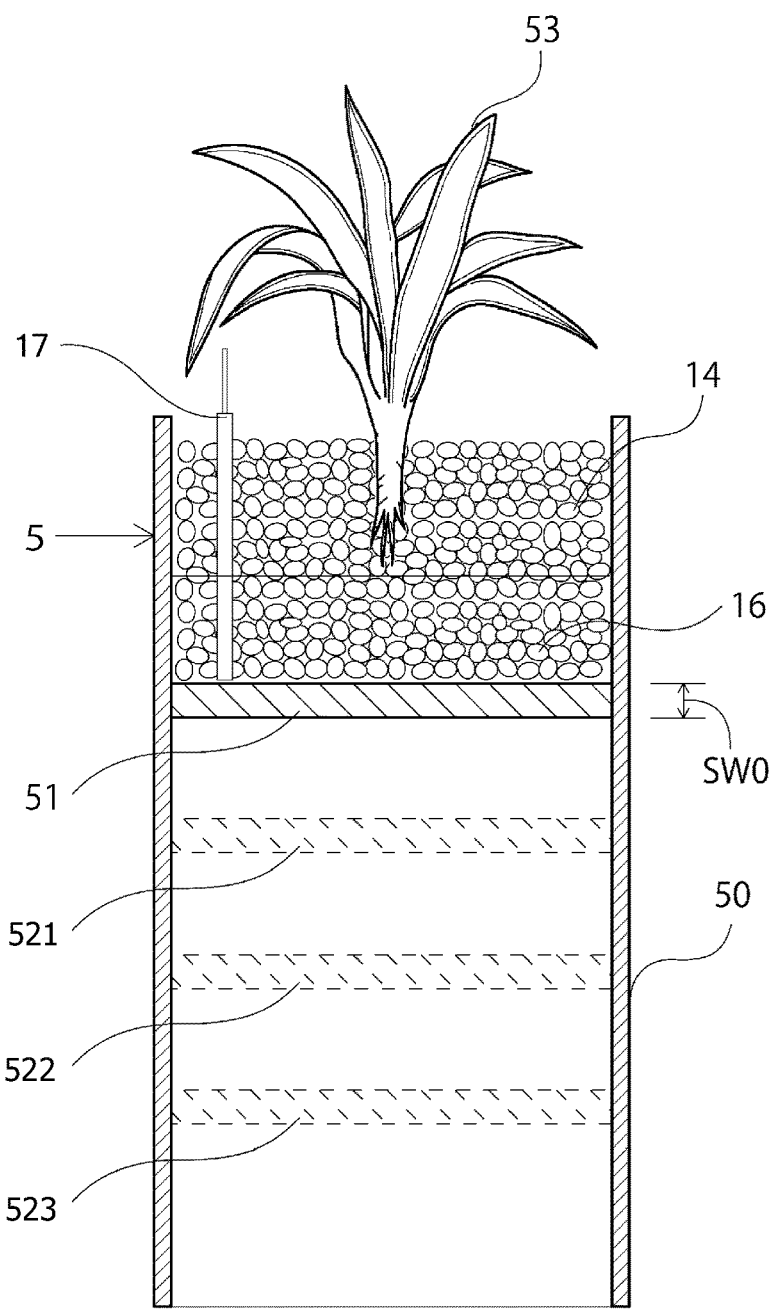
FIGS. 8A and 8B show a hydroculture pot according to a fifth embodiment of the present invention with FIG. 8A being a longitudinal sectional front view of a pot main body with a straight shape in a state where a partitioning wall is mounted to an interior and FIG. 8B being a plan view as viewed from above.
Figure 8B:
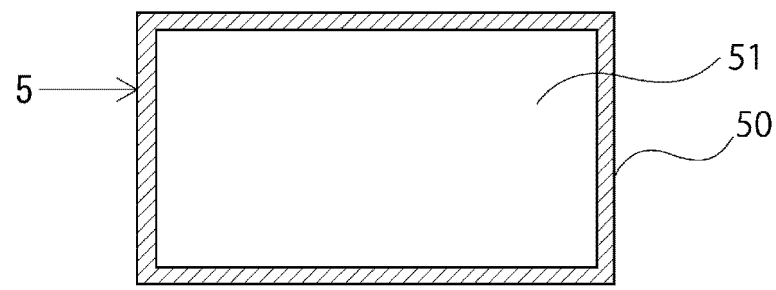

That is, with the present embodiment, 5 is the straight-shaped hydroculture pot, and as the straight-shaped hydroculture pot 5, a manufactured pot without a bottom at a lowermost portion of the pot is applied as shown in FIGS. 8A and 8B. At an inner circumferential surface of a pot main body 50 of the hydroculture pot 5, a partitioning wall 51 that vertically partitions an interior of a pot main body 50 in a watertight manner in accordance with a size of the small plant 53 is fixed by a frictional force in a state of applying a contact pressure against the inner circumferential surface of the pot main body 50.

An interior of the hydroculture pot 5 that is partitioned by the partitioning wall 51 is filled with the hydroculture soil 14 and the small plant 53 is planted as the hydroculture plant in the hydroculture soil 14. Also, water 16, provided in accordance with a size of the small plant 53, is stored on the partitioning wall 51 in the interior of hydroculture pot 5. Here, the water 16 stored in the interior of the pot main body 50 is of a water amount deemed necessary for approximately one week to two weeks of growth of the small plant 53 planted in the hydroculture pot 5 and storage of water of no less amount causes putrefaction of water and root rot.

Figure 9A:
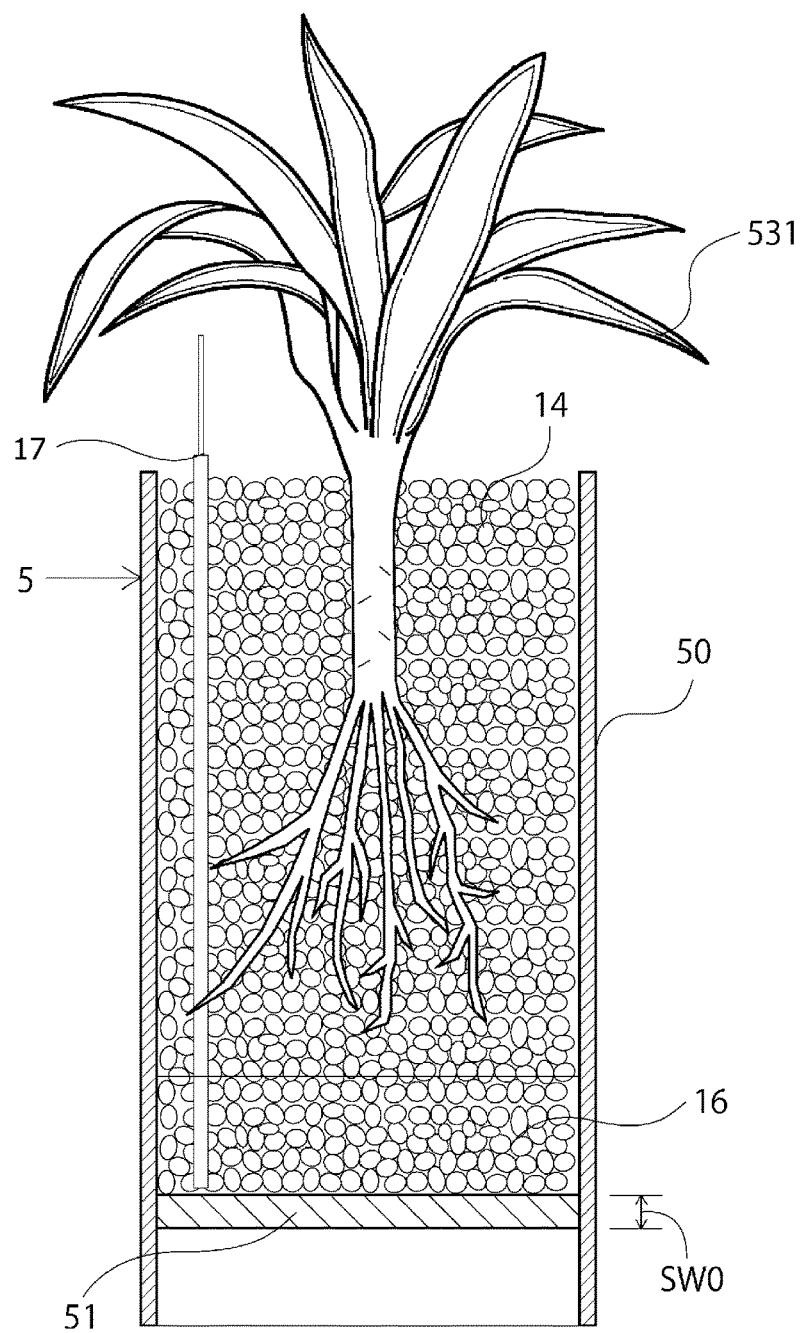
FIG. 9A is a longitudinal sectional front view of the pot main body of FIG. 8 in a state where the partitioning wall is changed in position downwardly in accordance with growth of roots, and FIG. 9B being a plan view as viewed from above.
Figure 9B:
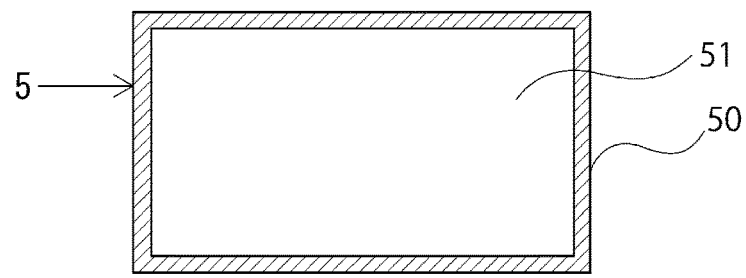

As shown in FIGS. 9A and 9B, in a case where a plant 531, resulting from growth of the plant 53, is to be replanted in the hydroculture pot 5, the position of the partitioning wall 51 can be changed downward to change the water amount storage position, thereby enabling prevention of root rot due to growth and further enabling reuse of the pot in which the plant was planted without having to rebuy a pot. In this case, SW0 is a thickness of the partitioning wall 51 that is selected in consideration of weights of the plants 53 and 531, the weight of the hydroculture soil 14, the weight of the water 16 of the optimum amount that is stored, etc.

The present invention is not restricted to the respective embodiments described above and includes various other modification examples. For example, although with each of the embodiments described above, the partitioning wall 12 or 51 or the second partitioning wall 42 or 43 is adhered to the partition portion of any of the pot main bodies 10 to 50 in the state of applying contact pressure against the inner circumferential surface of any of the pot main bodies 10 to 50, the interior of the pot main body may instead be partitioned by positioning, at the partition portion, a partitioning wall of an uppermost layer among partitioning walls piled up in layer form from the bottom portion of the pot main body. In this case, the weight of the hydroculture plant, the weight of the hydroculture soil, the weight of the water of the optimum amount that is stored, etc., that act on the partitioning walls can be received smoothly by the layered partitioning walls.

Also, although with the respective embodiments, hydroculture pots 1 to 5, used in cases where the spider plant 15, *Pachira aquatica* 25, or *Areca* palm 35 that was planted in a natural culture soil is replanted as the hydroculture plant in the hydroculture soil 14 upon washing off the natural culture soil with water from the roots, were described, application is also obviously possible to a hydroculture pot used in a case where a hydroculture plant, such as a hydroculture plant that was planted in a pot filled with an artificial culture soil, etc., is replanted.

Also, although with the respective embodiments, hydroculture pots 1 to 5 for planting hydroculture plants of comparatively long root depth of 70 to 290 mm were described, application is also obviously possible to a small hydroculture pot for planting a hydroculture plant with a root depth of approximately several dozen mm.

Also, although with the respective embodiments, cases where the spider plant 15, the *Pachira aquatica* 25, or the *Areca* palm 35 is planted or the small plant 53 and the plant 531 resulting from growth of the plant 53 are planted were described, the hydroculture plant is not restricted to the above. For example, as varieties favoring the root depth being positioned approximately 30 to 60 mm above the water level of the water of the optimum amount, succulent type hydroculture plants, such as *Sansevieria, Hoya*, and hydroculture plants, such as Asparagus, *Schefflera*, etc., can be cited in addition to the spider plant. Also, as varieties favoring the root depth being positioned approximately 10 to 30 mm above the water level of the water of the optimum amount, hydroculture plants, such as *Strelitzia augusta, Monstera, Dracaena fragrans, Dracaena concinna, Ficus umbellata*, etc., can be cited in addition to *Pachira aquatica*. Further, as varieties favoring the root depth being positioned approximately 10 to 30 mm below the water level of the water of the optimum amount, hydroculture plants, such as *Hypoestes phyllostachya*, etc., can be cited in addition to

*Areca* palm. Also, the above relationships between root depth and the water level of the water of the optimum amount take into consideration the stability of the hydroculture plant when planted in the pot main body, and such relationships must be determined in consideration of the stability of the hydroculture plant especially in the case of large, bulky hydroculture plants.

Figure 10A:
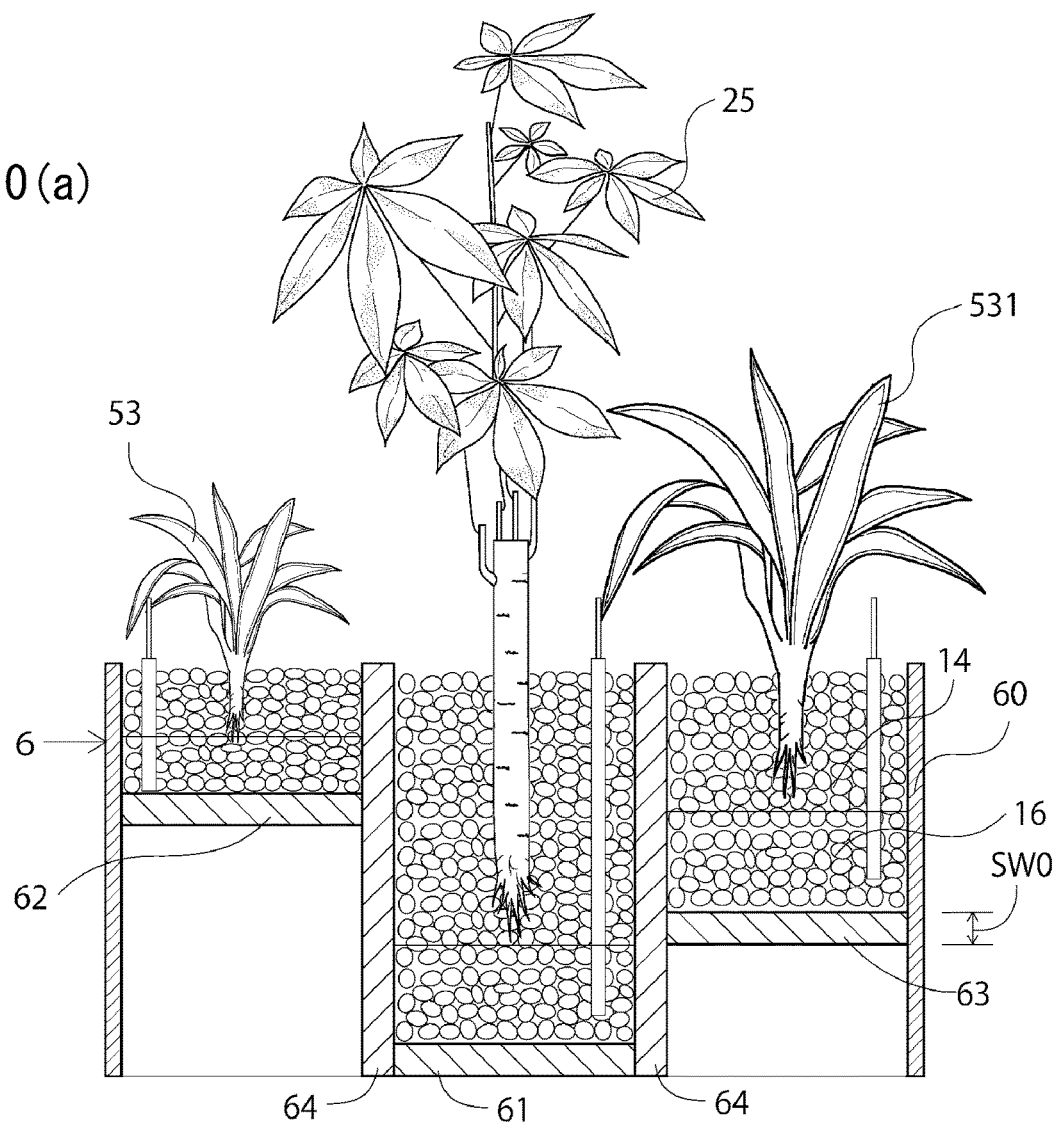
FIGS. 10A and 10B show a hydroculture pot according to a modification example of the fourth embodiment with FIG. 10A being a longitudinal sectional front view of a state where a partitioning wall is mounted vertically as a bottom plate or a partition in a pot main body interior and FIG. 10B being a plan view as viewed from above.
Figure 10B:
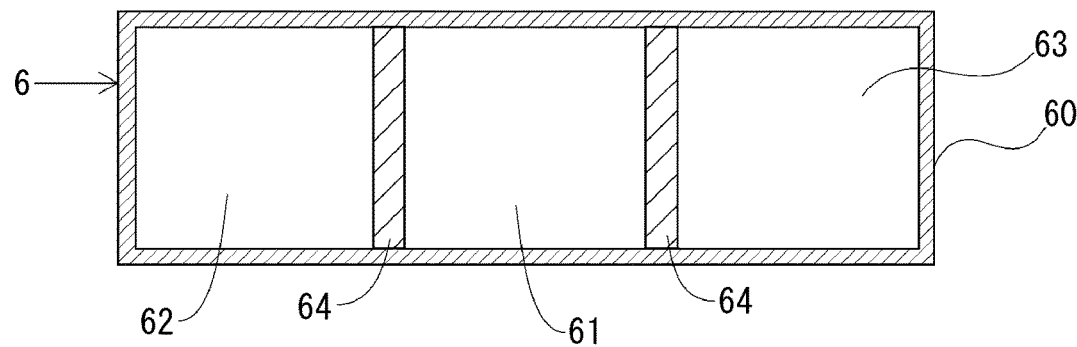

Also, although with the fourth embodiment, the interior of the pot main body 40 is partitioned to the right and left into the two internal spaces 404 and 403 by the first partitioning wall 41, an interior of a pot main body 60 may also be partitioned into three internal spaces 601, 602, and 603 in a plan view by two first partitioning walls 64 as shown in FIGS. 10A and 10B. In this case, to group-plant a plurality of types of hydroculture plants with large differences in root depth, such as the *Pachira aquatica* 25 as well as the small plant 53 and the plant 531 resulting from growth of the small plant, etc., second partitioning walls 61, 62, and 63 are provided so that the internal spaces 601 to 603, which are partitioned into three by the first partitioning walls 64, are respectively partitioned individually and vertically in a watertight manner. Any type of hydroculture plant may be group-planted, and obviously, partitioning into no less than four internal spaces in a plan view by no less than three first partitioning walls may be performed in accordance with a plurality of types of hydroculture plants with large differences in root depth.

Also, although with each of the embodiments, an existing pot, such as a soil culture pot, is used and the water 16, 26, or 36 of the appropriate amount at which the water level 361 is appropriate for the root depth R1 of the spider plant 15, the *Pachira aquatica* 25, or the *Areca* palm 35 is made to be stored by vertically partitioning the interior of the pot main body 10, 20, or 30 in a watertight manner by the partitioning wall 12 or the first or second partitioning walls 41 to 43 disposed at the inner circumferential surface of the pot main body 10, 20, or 30, the water of the optimum amount is solely an example based on empirical values and a position of partitioning by a partitioning wall is determined so that water of an optimum amount at which the water level is appropriate for the depth of the roots of the hydroculture plant is stored in accordance with circumstances or size of the hydroculture plant.

Also, with each of the embodiments, the soil culture pot having the supply and drainage hole 102, 202, 302, or 402, enabling supplying and draining the water 16, 26, or 36, in the bottom portion 101, 201, 301, or 401 is used as the hydroculture pot 1, 2, 3, or 4, an ornamental pot with which supply and drainage of water via the bottom portion is not possible, that is, an ornamental pot of ceramic, etc., that does not have a supply and drainage hole in a bottom portion may obviously be used as well. Also, with an ornamental pot that is a cup made of glass, etc., there is no need to waterproof a side surface, and thus a coating waterproofing material that becomes semitransparent after curing is used and the partitioning wall is coated to a substantially uniform thickness by the coating waterproofing material (for example, of approximately 1 mm to 5 mm) by pouring in slowly from a middle of the partitioning wall so that the coating waterproofing material does not become attached to the side surface. In this case, with the glass cup or other ornamental pot, the interior is transparent and thus porous colored sand, with which an ion exchange mineral used as a root rot preventing agent is colored with a plant-based dye, etc., may be used.

With a glass ornamental pot, with which the interior is transparent, by disposing a hydroculture pot in the interior of the glass ornamental pot and using porous colored sand, with which an ion exchange mineral used as a root rot preventing agent is colored with a plant-based dye, etc., at a periphery, a color sand pot of excellent interior design characteristics is arranged, replanting can be performed without disrupting the colored sand, and generation of algae on the colored sand design portion can also be prevented. Also, an existing pot of excellent interior design characteristics can be used as a hydroculture pot cover by providing the hydroculture pot in the interior even if the existing pot cannot be used in itself as a hydroculture pot due to enabling supply and drainage to and from a bottom portion.

Further, although with each of the embodiments, the interior of the hydroculture pot 1, 2, 3, 4, 5, or 6 is filled with the hydroculture soil 14, a pot in which a hydroculture plant is planted in a hydroculture soil may be housed in an interior of a hydroculture pot. In this case, if a supply and drainage hole, enabling supplying and draining of water, is provided in a bottom portion of the pot, a partitioning wall that vertically partitions an interior of a pot main body in a watertight manner is provided so that water of an optimum amount at which a water level is appropriate for a depth of roots of the hydroculture plant is stored. On the other hand, in a case where a supply and drainage hole, enabling supplying and draining of water, is not provided in a bottom portion of the pot, a partitioning wall is disposed at a position at which an appearance of the hydroculture plant is satisfactory or a position at which the pot is hidden in the interior of the pot main body.

What is claimed is:

1. A hydroculture pot for a hydroculture plant comprising:
   a cylindrical pot main body having an inner circumferential surface defining a diameter, the cylindrical pot having a top edge and a bottom, the diameter of the cylindrical pot increasing from the bottom to the top edge; and
   a partitioning wall vertically partitioning the inner circumferential surface of the cylindrical pot main body and defining a first cavity above the partitioning wall and a second cavity below the partitioning wall,
   wherein the partitioning wall is elastic and slightly larger than an inner diameter of a partition portion of the cylindrical pot main body,
   wherein the partitioning wall is configured to be press-contacted by a frictional force in a state of applying a contact pressure with the inner circumferential surface of the cylindrical pot main body,
   wherein the partition portion is positionable in a plurality of different positions in a vertical direction with respect to the inner circumferential surface of the pot main body to thereby provide a plurality of different sizes of the first cavity above the partitioning wall,
   wherein the partitioning wall is impermeable to water and engages the inner circumferential surface of the cylindrical pot main body in a watertight manner to prevent liquids from moving from one of the first and second cavities to the other of the first and second cavities, and
   wherein the first cavity defines a volume corresponding to an amount of liquid deemed necessary for approximately one week to two weeks of growth of the hydroculture plant.

2. The hydroculture pot according to claim 1, wherein the cylindrical pot main body comprises a soil culture pot.

3. The hydroculture pot according to claim 1, wherein the partitioning wall is removable from the cylindrical pot main body and is made reconstructable in the cylindrical pot main body after being removed from the cylindrical pot main body.

4. A hydroculture pot comprising:
a cylindrical pot main body having an inner circumferential surface defining a diameter, the cylindrical pot having a top edge and a bottom, the diameter of the cylindrical pot increasing from the bottom to the top edge;
a first partitioning wall which is substantially rectangular shaped and which is vertically engageable with the inner circumferential surface of the cylindrical pot main body to partition the cylindrical pot main body into first and second horizontal sections; and
second partitioning walls having substantially arcuate shapes in accordance with the shapes of the first and second horizontal sections to vertically partition the first and second horizontal sections of the cylindrical pot main body and defining a first cavity above each of the second partitioning walls and a second cavity below each of the second partitioning walls,
wherein the first partitioning wall is elastic and slightly larger than an inner dimension of a first partition portion,
wherein the second partitioning walls are elastic and slightly larger than an inner dimension of second partition portions of respective ones of the first and second horizontal sections defined by the cylindrical pot main body and the first partitioning wall,
wherein the first partitioning wall is configured to be press-contacted with the inner circumferential surface of the cylindrical pot main body,
wherein the second partitioning walls are configured to be press-contacted with the inner circumferential surface of the cylindrical pot main body and the first partitioning wall,
wherein the first partition portion for the first partitioning wall is positionable in a plurality of different positions in a horizontal direction with respect to the inner circumferential surface of the cylindrical pot main body,
wherein each second partition portion for the second partitioning walls respectively is positionable in a plurality of different positions in a vertical direction with respect to the inner surface of the first and second horizontal sections to thereby provide a plurality of different sizes of the first cavities above the second partitioning walls,
wherein the first partitioning wall and the second partitioning walls are impermeable to water, the first partitioning wall engages the inner circumferential surface of the cylindrical pot main body in a watertight manner and the second partitioning walls engage the inner surface of the cylindrical pot main body and the first partitioning wall in a watertight manner to prevent liquids from moving from one of the first and second cavities to the other of the first and second cavities, and
wherein each of the first cavities defines a volume corresponding to an amount of liquid deemed necessary for approximately one week to two weeks of growth of the hydroculture plant.

5. The hydroculture pot according to claim 4, wherein the cylindrical pot main body comprises a soil culture pot.

6. The hydroculture pot according to claim 4, wherein the partitioning wall is removable from the cylindrical pot main body and is made reconstructable in the cylindrical pot main body after being removed from the cylindrical pot main body.

* * * * *